(12) United States Patent
Kondo et al.

(10) Patent No.: US 12,429,131 B2
(45) Date of Patent: Sep. 30, 2025

(54) TRAVELING DEVICE FOR WHEELED VEHICLE

(71) Applicant: Hitachi Construction Machinery Co., Ltd., Tokyo (JP)

(72) Inventors: Akinori Kondo, Tsukuba (JP); Takeshi Shinohara, Hitachinaka (JP); Hiroki Yamamoto, Kashiwa (JP); Daisuke Takeshita, Tsuchiura (JP); Yuutarou Iwabuchi, Ushiku (JP); Takahiro Sato, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/709,125

(22) PCT Filed: Mar. 23, 2023

(86) PCT No.: PCT/JP2023/011394
§ 371 (c)(1),
(2) Date: Nov. 4, 2024

(87) PCT Pub. No.: WO2023/182403
PCT Pub. Date: Sep. 28, 2023

(65) Prior Publication Data
US 2025/0067335 A1    Feb. 27, 2025

(30) Foreign Application Priority Data
Mar. 24, 2022  (JP) .................................. 2022-048400

(51) Int. Cl.
*F16H 1/28*    (2006.01)
*B60K 17/04*   (2006.01)
(Continued)

(52) U.S. Cl.
CPC ....... *F16H 57/0471* (2013.01); *B60K 17/046* (2013.01); *F16H 1/28* (2013.01);
(Continued)

(58) Field of Classification Search
CPC ............. F16H 57/0471; F16H 57/0423; F16H 57/0436; F16H 57/045; F16H 57/0486;
(Continued)

(56) References Cited

U.S. PATENT DOCUMENTS

| 5,663,640 A | * | 9/1997 | Sakamoto ............. F16C 41/007 |
| | | | 324/207.25 |
| 2004/0065169 A1 | | 4/2004 | Ciszak et al. |

(Continued)

FOREIGN PATENT DOCUMENTS

| JP | 58-138856 U | 9/1983 |
| JP | 2007-16906 A | 1/2007 |
| JP | 2010-116963 A | 5/2010 |

OTHER PUBLICATIONS

International Search Report (PCT/ISA/210) issued in PCT Application No. PCT/JP2023/011394 dated Jun. 13, 2023 with English translation (5 pages).

(Continued)

*Primary Examiner* — Farhana Pervin
(74) *Attorney, Agent, or Firm* — Crowell & Moring LLP

(57) ABSTRACT

A traveling device (11) is provided with a cylindrical spindle (12), a rotation shaft (14) that is disposed on an inner peripheral side of the spindle (12) and is rotated by a traveling motor (13), a wheel attaching cylinder (16) that is rotatably disposed on an outer peripheral side of the spindle (12) and to which a wheel (7) is attached and in the inside of which the lubricating oil (L) is accommodated, a gear reduction mechanism (21) that decelerates the rotation of the rotation shaft (14) and transmits the decelerated rotation to (Continued)

the wheel attaching cylinder (16), a retainer (42) that is provided with a bearing fitting hole (42A) and is disposed on the inner peripheral side of the spindle (12), and a bearing (44) that is attached to the retainer (42) and supports the rotation shaft (14). A collar part (42D) that abuts on the bearing (44) is disposed on the surface of the retainer (42) at the traveling motor (13)-side, and an oil reservoir plate (47) is disposed on the surface of the retainer (42) at the gear reduction mechanism (21)-side, wherein the oil reservoir plate (47) forms an oil reservoir part (49) of the lubricating oil (L) together with the collar part (42D) and an inner peripheral surface (42C) of the bearing fitting hole (42A).

5 Claims, 9 Drawing Sheets

(51) Int. Cl.
*F16H 57/04* (2010.01)
*B60K 7/00* (2006.01)

(52) U.S. Cl.
CPC ..... *F16H 57/0423* (2013.01); *F16H 57/0436* (2013.01); *F16H 57/045* (2013.01); *B60K 7/0007* (2013.01); *B60K 2007/0092* (2013.01); *F16H 57/0486* (2013.01)

(58) Field of Classification Search
CPC ...... F16H 57/0409; F16H 57/046; F16H 1/28; B60K 17/046; B60K 7/0007; B60K 2007/0092
See application file for complete search history.

(56) References Cited

U.S. PATENT DOCUMENTS

| | | | |
|---|---|---|---|
| 2010/0119184 A1* | 5/2010 | Shibukawa | F16C 33/6659 384/462 |
| 2010/0191417 A1* | 7/2010 | Murahashi | B60B 11/06 184/26 |
| 2011/0200282 A1* | 8/2011 | Shinohara | B60K 17/046 384/462 |
| 2012/0142475 A1* | 6/2012 | Shibukawa | B60K 7/0007 475/159 |
| 2013/0056289 A1* | 3/2013 | Shibukawa | B60K 17/046 180/62 |
| 2013/0065724 A1* | 3/2013 | Shinohara | B60K 17/046 475/159 |
| 2018/0051794 A1* | 2/2018 | Kodama | F16H 57/0426 |

OTHER PUBLICATIONS

Japanese-language Written Opinion (PCT/ISA/237) issued in PCT Application No. PCT/JP2023/011394 dated Jun. 13, 2023 with English translation (7 pages).
Japanese-language International Preliminary Report on Patentability (PCT/IPEA/416 & PCT/IPEA/409) issued in PCT Application No. PCT/JP2023/011394 dated Dec. 1, 2023, including Annexes with partial English Translation (13 pages).

* cited by examiner

TRAVELING DEVICE FOR WHEELED VEHICLE

TECHNICAL FIELD

The present invention relates to a traveling device that is used suitably for a wheeled vehicle having wheels, such as a dump truck, for example.

BACKGROUND ART

In general, a traveling device that is disposed in a wheeled vehicle, for example, a dump truck is provided with a cylindrical spindle that is fixed on a vehicle body, a rotation shaft that is disposed in such a manner as to axially extend on an inner peripheral side of the spindle and is driven and rotated by a drive source, a wheel attaching cylinder that is rotatably disposed on an outer peripheral side of the spindle and on an outer peripheral side of which a wheel is attached and on an inner peripheral side of which lubricant oil is accommodated, and a planetary gear reduction mechanism that decelerates rotation of the rotation shaft and transmits the decelerated rotation to the wheel attaching cylinder. The planetary gear reduction mechanism decelerates rotational output of a drive source of an electric motor or the like and transmits the decelerated rotational output to a wheel (drive wheel) via the wheel attaching cylinder, causing the drive wheel to generate a large rotational toque to travel the dump truck (Refer to Patent Document 1).

The rotation shaft in the traveling device is disposed between the drive source and the planetary gear reduction mechanism (sun gear) in a state of axially extending on the inner peripheral side of the spindle. Therefore, a longitudinal intermediate part of the rotation shaft is rotatably supported to the spindle by a bearing disposed on the inner peripheral side of the spindle. Since the dump truck transports heavy objects such as crushed stones mined in a mine or the like, a large rotational load is applied on the traveling device. Therefore, it is necessary to keep a state where the rotation shaft and the bearing can always rotate smoothly by supplying sufficient lubricating oil to the bearing.

Here, in a case where a large amount of lubricating oil is accommodated in the inside of the traveling device, the traveling device results in energy losses, heat generation and the like caused by resistances (stirring resistances) at the time the lubricating oil is stirred by the planetary gear reduction mechanism. Therefore, the lubricating oil to be accommodated in the inside of the traveling device is generally set to a minimal oil quantity (for example, approximately ⅕ to ⅓ of an internal volume of a wheel attaching cylinder). In this way, in a case of setting the lubricating oil to the minimal oil quantity, since an oil surface of the lubricating oil is in a position lower than the rotation shaft, the rotation shaft and the bearing are not immersed in the lubricating oil and part of planetary gears, carriers and the like configurating the planetary gear reduction mechanism is immersed in the lubricating oil. Therefore, the lubricating oil is splashed by the planetary gear reduction mechanism when the traveling device is driven, and thereby the lubricating oil is scattered in a mist shape to be supplied to the bearing as needed.

However, the traveling device according to Patent Document 1 is configured so that the lubricating oil in the mist shape formed by the splashing of the planetary gear reduction mechanism is supplied to the bearing for supporting the rotation shaft. Because of this configuration, there is a problem that the lubricating oil enough for the bearing cannot always be supplied to the bearing.

On the other hand, there is proposed a traveling device in which an oil passage leading lubricating oil to a bearing is formed in a retainer for retaining the bearing to a spindle (Refer to Patent Document 2). This traveling device sucks up the lubricating oil accommodated in the inside of the wheel attaching cylinder (drum) by a pump to be supplied to the oil passage formed in the retainer, whereby the lubricating oil can be supplied sufficiently to the bearing.

PRIOR ART DOCUMENT

Patent Document

Patent Document 1: U.S. Patent Application Publication No. 2004/0065169

Patent Document 2: Japanese Patent Laid-Open No. 2010-116963

SUMMARY OF THE INVENTION

However, in the traveling device according to Patent Document 2, when the traveling device rotates at high speeds, the lubricating oil accommodated in the inside of the wheel attaching cylinder is pressed against an inner peripheral surface of the wheel attaching cylinder by a centrifugal force. As a result, there are some cases where a liquid surface position of the lubricating oil is lowered. Because of this configuration, there occurs a problem that the lubricating oil accommodated in the inside of the wheel attaching cylinder cannot be sucked up by a pump and the lubricating oil cannot stably be supplied to the bearing.

An object of the present invention is to provide a traveling device for wheeled vehicle that can always supply lubricating oil sufficiently to a bearing that supports a rotation shaft.

An aspect of the present invention is applied to a traveling device for wheeled vehicle comprising: a cylindrical spindle that is fixed on a vehicle body in a wheeled vehicle; a rotation shaft that is disposed in such a manner as to axially extend on an inner peripheral side of the spindle and is driven and rotated by a drive source; a wheel attaching cylinder that is rotatably disposed on an outer peripheral side of the spindle and on an outer peripheral side of which a wheel is attached and in the inside of which lubricating oil is accommodated; a gear reduction mechanism that decelerates rotation of the rotation shaft and transmits the decelerated rotation to the wheel attaching cylinder; a retainer that is provided with a bearing fitting hole and is positioned between the drive source and the gear reduction mechanism to be disposed on an inner peripheral side of the spindle; and a bearing that is inserted in the bearing fitting hole of the retainer and rotatably supports the rotation shaft to the spindle, characterized in that the retainer is provided with: an annular collar part on a surface on the drive source side, the annular collar part extending to a radial inner side from the bearing fitting hole and abutting on the bearing; and an oil reservoir plate at the gear reduction mechanism side, the oil reservoir plate being disposed in a position axially opposing the collar part via the bearing and forming an oil reservoir part of the lubricating oil together with the collar part and an inner peripheral surface of the bearing fitting hole.

According to the aspect of the present invention, the lubricating oil to be supplied to the bearing that supports the rotation shaft can be reserved in the oil reservoir part formed by the collar part of the retainer, the inner peripheral surface of the bearing fitting hole and the oil reservoir plate. With this configuration, the lubricating oil reserved in the oil reservoir part can sufficiently be supplied to the bearing regardless of the traveling state of the vehicle body to rotate the rotation shaft smoothly.

MODE FOR CARRYING OUT THE INVENTION

Figure 1:
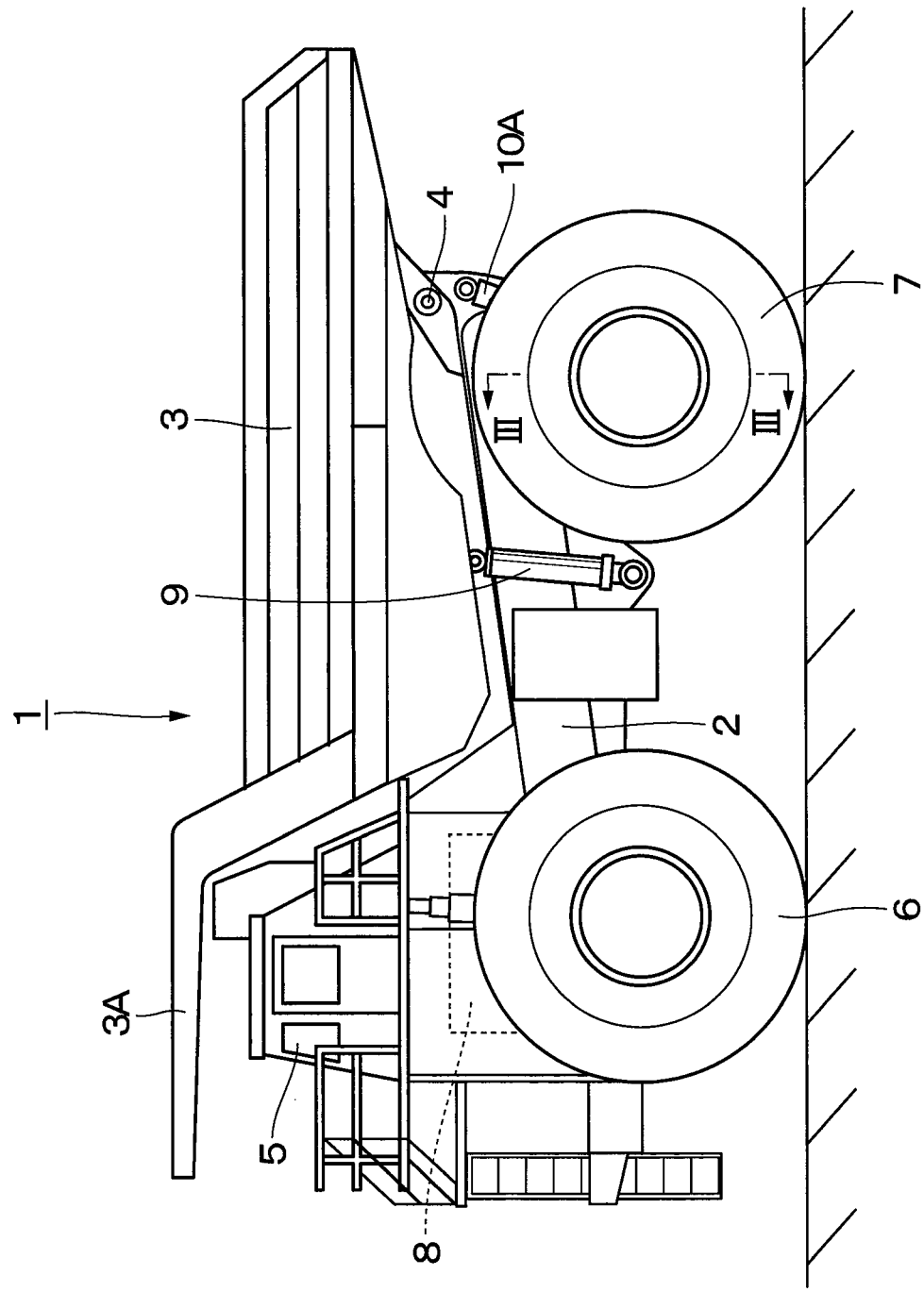
FIG. 1 is a left side view showing a dump truck to which a traveling device according to a first embodiment of the present invention is applied.
Figure 2:
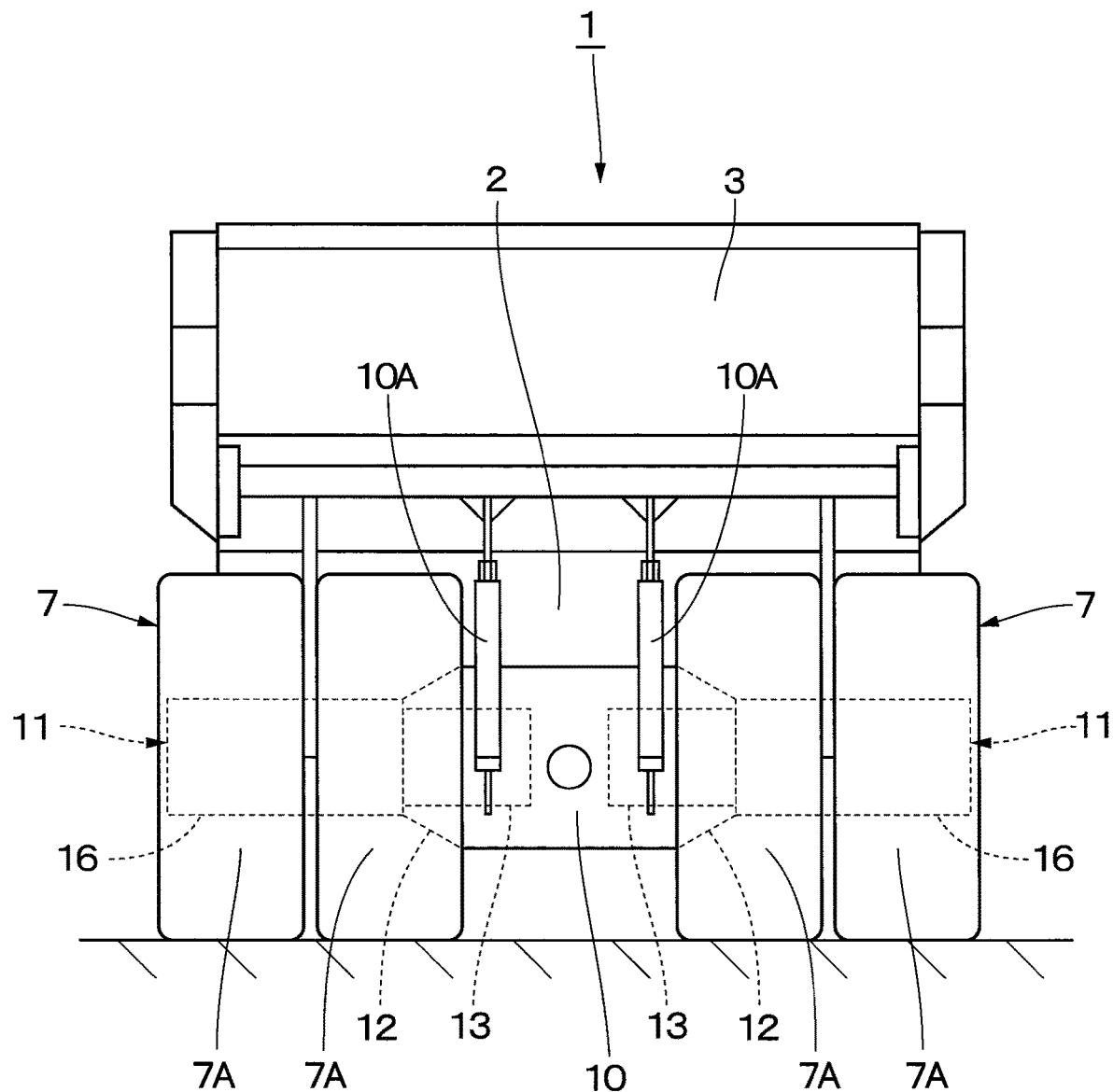
FIG. 2 is a rear view showing the dump truck, as viewed from the backside.

Hereinafter, a traveling device for wheeled vehicle according to an embodiment of the present invention will be in detail explained with reference to the accompanying drawings by taking a case of being applied to a dump truck of a rear wheel drive system as an example. It should be noted that in the embodiment, a traveling direction of the dump truck is defined as a front-rear direction and a direction perpendicular to the traveling direction is defined as a left-right direction.

FIG. 1 to FIG. 5 show a first embodiment of the present invention. In the figures, a dump truck 1 includes a vehicle body 2 having a strong frame structure, a vessel (loading platform) 3 mounted on the vehicle body 2 to be capable of lifting and tilting, a cab 5 disposed in the front part of the vehicle body 2, and left and right front wheels 6 and left and right rear wheels 7 as wheels.

The vessel 3 is formed as a large-sized container for loading heavy baggage such as crushed stones. A rear-side bottom part of the vessel 3 is coupled to a rear end side of the vehicle body 2 through a coupling pin 4 and the like to be capable of lifting and tilting (inclination-rotating). In addition, a protector 3A is integrally disposed on a front-side upper part of the vessel 3 in such a manner as to cover the cab 5 from the upper side. The cab 5 is disposed in the front part of the vehicle body 2 to be positioned under the protector 3A. The cab 5 forms an operator's room. An operator's seat, a handle for steering, a plurality of control levers (none of them are shown) and the like are arranged inside the cab 5.

Figure 3:
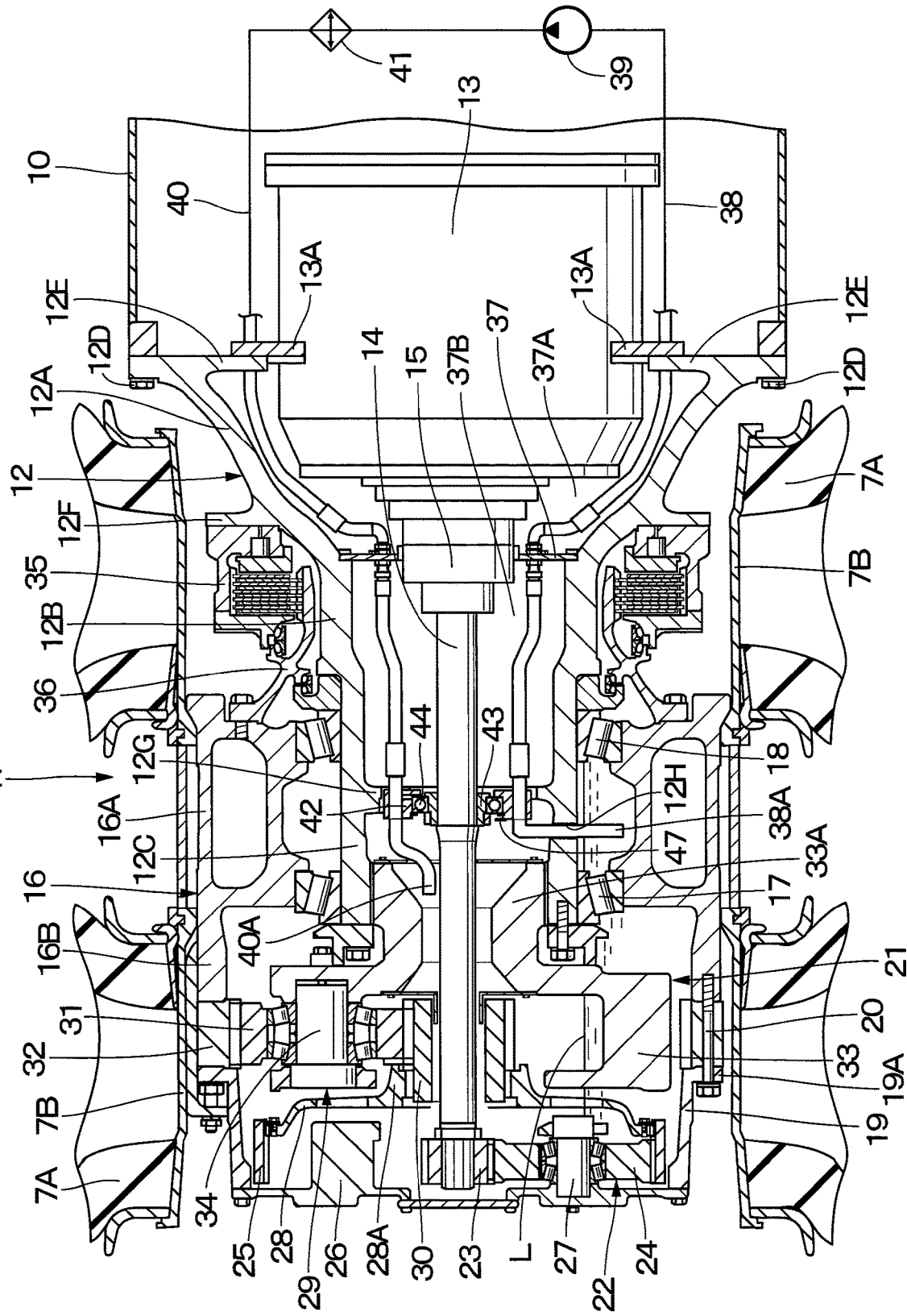
FIG. 3 is a cross section showing the traveling device on the rear wheel side, as viewed in a direction of arrows III-III in FIG. 1.

The left and right front wheels 6 are rotatably arranged on the front side of the vehicle body 2 (the left front wheel only is shown). The left and right front wheels 6 form steered wheels that are steered by an operator. The left and right rear wheels 7 are rotatably arranged on the rear side of the vehicle body 2 (the left rear wheel only is shown). The left and right rear wheels 7 form drive wheels of the dump truck 1 and are driven and rotated integrally with a wheel attaching cylinder 16 by a traveling device 11 as shown in FIG. 3. The rear wheel 7 includes two rows of tires 7A composed of dual tires and rims 7B respectively located in a radial inner side of the tires 7A.

An engine 8 is positioned under the cab 5 to be disposed within the vehicle body 2. The engine 8 is configured by, for example, a diesel engine or the like, and drives and rotates an after-mentioned traveling motor 13, a hydraulic pump (not shown) and the like, which are mounted on the vehicle body 2. Pressurized the hydraulic pump is supplied to oil delivered from after-mentioned hoist cylinders 9, a steering cylinder for power steering (not shown) and the like.

The hoist cylinders 9 are disposed between the vehicle body 2 and the vessel 3. The hoist cylinders 9 are positioned between the front wheel 6 and the rear wheel 7 to be located on both left and right sides of the vehicle body 2. Each of the hoist cylinders 9 expands and contracts in the upper-lower direction by delivery/suction of the pressurized oil from/to the hydraulic pump to lift and tilt (inclination-rotate) the vessel 3 around the coupling pin 4.

An axle housing 10 on the rear wheel side is disposed on a rear side of the vehicle body 2. The axle housing 10 is formed as a hollow cylindrical body that extends in the left-right direction (in the axial direction). The axle housing 10 is attached through left and right rear-wheel side suspensions 10A to the rear side of the vehicle body 2. The traveling devices 11 for driving the left and right rear wheels 7 are disclosed to both left and right sides of the axle housing 10 respectively.

The traveling device 11 is disposed on each of both left and right sides of the axle housing 10. As shown in FIG. 3, the traveling device 11 includes a spindle 12, the traveling motor 13, a rotation shaft 14, the wheel attaching cylinder 16, a gear reduction mechanism 21, a retainer 42, a bearing 44, and an oil reservoir plate 47. The traveling device 11 decelerates rotation of the rotation shaft 14 by the gear reduction mechanism 21 and drives the left and right rear wheels 7 as drive wheels by a large rotational torque for rotation.

The spindle 12 is disposed on each of both left and right sides of the axle housing 10. The spindle 12 extends in the left-right direction to be formed in a stepped cylindrical shape and includes a tapered part 12A, an intermediate cylindrical part 12B and a small-diameter cylindrical part 12C. The tapered part 12A is formed in a tapered shape to gradually reduce in diameter from an axial one side (axle housing 10-side) toward an axial other side of the spindle 12 and is attached to an end part of the axle housing 10 by using a plurality of bolts 12D. The intermediate cylindrical part 12B is formed integrally with a diameter-reduced side of the tapered part 12A to axially extend. The small-diameter cylindrical part 12C has an outer diameter dimension smaller than the intermediate cylindrical part 12B and is formed integrally with a tip end side of the intermediate cylindrical part 12B.

A plurality of motor attaching seatings 12E projecting to a radial inner side are arranged on an axial one side of the tapered part 12A and the traveling motor 13 is attached to the motor attaching seatings 12E. An annular flange part 12F projecting to a radial outer side is disposed on an outer peripheral side of the tapered part 12A and an after-mentioned wet type brake 35 is attached to the flange part 12F.

On the other hand, a tip end of the small-diameter cylindrical part 12C is formed as an open end, and a cylindrical projection part 33A of an after-mentioned second-stage carrier 33 is spline-coupled to an inner peripheral side of the small-diameter cylindrical part 12C. An annular inner-side projection part 12G projecting to a radial inner side is formed integrally with an inner peripheral side of an axial intermediate cylindrical part 12C and the part of the small-diameter after-mentioned retainer 42 is attached to the inner-side projection part 12G. Further, a radial hole 12H is drilled on a lower side of the small-diameter cylindrical part 12C to penetrate therethrough in the upper-lower direction (in a radial direction of the small-diameter cylindrical part 12C), and a tip end 38A of an after-mentioned suction pipe 38 is inserted in the radial hole 12H.

The traveling motor 13 as a drive source is located in the axle housing 10 and in the tapered part 12A of the spindle 12. A plurality of attaching flanges 13A are arranged on an outer peripheral side of the traveling motor 13, and the attaching flanges 13A are attached to the motor attaching seatings 12E of the spindle 12 (tapered part 12A) by using bolts or the like. The traveling motor 13 is configured by an electric motor and drives the rotation shaft 14 for rotation by supply of electric power from a power generator (not shown) mounted on the vehicle body 2.

The rotation shaft 14 is disposed to axially extend on an inner peripheral side of the spindle 12. The rotation shaft 14 is formed by a single bar-shaped body, one end side of the rotation shaft 14 is connected via a coupling 15 to an output shaft (not shown) of the traveling motor 13 and the rotation shaft 14 is driven and rotated by the traveling motor 13. The other end side of the rotation shaft 14 projects from the open end of the small-diameter cylindrical part 12C of the spindle 12, and an after-mentioned sun gear 23 is attached to the other end (projection end) of the rotation shaft 14. An axial intermediate part of the rotation shaft 14 is rotatably supported to the spindle 12 by the bearing 44.

The wheel attaching cylinder 16 is rotatably disposed via two roller bearings 17, 18 on an outer peripheral side of the small-diameter cylindrical part 12C configuring part of the spindle 12. The wheel attaching cylinder 16 is supported by the two roller bearings 17, 18 and includes a hollow cylindrical part 16A axially extending on the outer peripheral side of the small-diameter cylindrical part 12C and an extension cylindrical part 16B that projects axially from a tip end of the hollow cylindrical part 16A and extends in a direction away from the spindle 12. The cylindrical rim 7B configuring part of the rear wheel 7 is removably attached to the outer peripheral side of the wheel attaching cylinder 16, and the rear wheel 7 rotates integrally with the wheel attaching cylinder 16. An after-mentioned internal gear 32 and an outer drum 19 are fixed integrally to an end part of the extension cylindrical part 16B of the wheel attaching cylinder 16 by using elongated bolts 20. The outer drum 19 is composed of a cylindrical body, and a flange part 19A disposed on an axial one side of the outer drum 19 is fixed via the internal gear 32 to the wheel attaching cylinder 16. An axial other side of the outer drum 19 is formed as an open end.

The gear reduction mechanism 21 is disposed between the rotation shaft 14 and the wheel attaching cylinder 16. The gear reduction mechanism 21 is configured by a first-stage planetary gear reduction mechanism 22 and a second-stage planetary gear reduction mechanism 29. The gear reduction mechanism 21 decelerates the rotation of the rotation shaft 14 by two stages, which is transmitted to the wheel attaching cylinder 16.

The first-stage planetary gear reduction mechanism 22 includes the sun gear 23, a plurality of planetary gears 24 and a carrier 26. The sun gear 23 is spline-coupled to a tip end of the rotation shaft 14 projecting from the spindle 12 (small-diameter cylindrical part 12C). The plurality of planetary gears 24 are engaged to the sun gear 23 and a ring-shaped internal gear 25 and rotate on its axis and revolve around the sun gear 23. The carrier 26 is fixed by bolts or the like on the open end of the outer drum 19 integral with the wheel attaching cylinder 16 and rotatably supports the plurality of planetary gears 24 through support pins 27.

Here, the internal gear 25 is formed by using a ring gear to surround the sun gear 23 and the plurality of planetary gears 24 from a radial outside. The internal gear 25 is located through a radial gap to an inner peripheral surface of the outer drum 19 to be rotatable thereto. The rotation of the internal gear 25 is transmitted through a coupling 28 to the second-stage planetary gear reduction mechanism 29.

The coupling 28 is disposed in a position between the first-stage planetary gear reduction mechanism 22 and the second-stage planetary gear reduction mechanism 29. The coupling 28 is formed in a disc shape with a boss 28A in the center part. An outer peripheral side of the coupling 28 is spline-coupled to the first-stage internal gear 25. An inner peripheral side of the boss 28A in the coupling 28 is spline-coupled to an after-mentioned second-stage sun gear 30. The coupling 28 transmits rotation of the first-stage internal gear 25 to the second-stage sun gear 30 to rotate the sun gear 30 integrally with the first-stage internal gear 25.

As the sun gear 23 is rotated integrally with the rotation shaft 14 by the traveling motor 13, the first-stage planetary gear reduction mechanism 22 converts the rotation of the sun gear 23 into a rotating movement of the plurality of planetary gears 24 on its axis and a revolving movement thereof. Further, the rotating movement on its axis of the planetary gears 24 is transmitted to the internal gear 25 as the decelerated rotation and the rotation of the internal gear 25 is transmitted through the coupling 28 to the second-stage planetary gear reduction mechanism 29. On the other hand, the revolving movement of the planetary gears 24 is transmitted via the outer drum 19 to the wheel attaching cylinder 16 as rotation of the carrier 26. At this time, since the wheel attaching cylinder 16 rotates integrally with the second-stage internal gear 32, the revolving movement of the planetary gears 24 is controlled to the rotation synchronized with the wheel attaching cylinder 16.

The second-stage planetary gear reduction mechanism 29 includes the cylindrical sun gear 30, a plurality of planetary gears 31, and the carrier 33. The sun gear 30 is spline-coupled to an inner peripheral side of the boss 28A in the coupling 28 to rotate integrally with the coupling 28. The plurality of planetary gears 31 are engaged to the sun gear 30 and the ring-shaped internal gear 32 to rotate on its axis and revolve around the sun gear 30. The carrier 33 rotatably supports the planetary gears 31 through support pins 34. The cylindrical projection part 33A in a cylindrical shape is disposed in the center part of the carrier 33 and an outer peripheral side of the cylindrical projection part 33A is spline-coupled to an inner peripheral side of the small-diameter cylindrical part 12C. Here, the second-stage internal gear 32 is formed by using a ring gear surrounding the sun gear 30, the plurality of planetary gears 31, and the like from a radial outer side. The second-stage internal gear 32 is fixed integrally between the extension cylindrical part 16B in the wheel attaching cylinder 16 and the outer drum 19 by using elongated bolts 20.

In the second-stage planetary gear reduction mechanism 29, when the cylindrical projection part 33A of the carrier 33 is spline-coupled to the small-diameter cylindrical part 12C of the spindle 12, the revolving movement of the planetary gear 31 (rotation of the carrier 33) is restrained. Therefore, when the sun gear 30 rotates integrally with the coupling 28, the second-stage planetary gear reduction mechanism 29 converts rotation of the sun gear 30 into a rotating movement of the planetary gear 31 and transmits the rotating movement of the planetary gear 31 to the second-stage internal gear 32. With this configuration, the internal gear 32 rotates while decelerating, and rotational torque of large output decelerated by two stages in the first-stage planetary gear reduction mechanism 22 and in the second-stage planetary gear reduction mechanism 29 is transmitted to the wheel attaching cylinder 16 to which the internal gear 32 is fixed.

Here, lubricating oil L is reserved in the inside of the wheel attaching cylinder 16, and a liquid surface of the lubricating oil L is in a position lower than the lowest part of the small-diameter cylindrical part 12C configuring part of the spindle 12, for example. Therefore, lower parts of the roller bearings 17, 18 are immersed in the lubricating oil L and part of the planetary gear reduction mechanisms 22, 29 is always lubricated by the lubricating oil L. In addition, the lubricating oil L splashed by the planetary gear reduction mechanisms 22, 29 scatters in a mist shape in the spindle 12, which is supplied also to the bearing 44 supporting the rotation shaft 14. As a result, at the operating of the traveling device 11, the resistance against the stirring of the lubricating oil L is made small, making it possible to suppress the energy loss and heat generation of the traveling device 11.

The wet type brake 35 is attached to the flange part 12F of the spindle 12. The wet type brake 35 is configured of a wet multi-plate type of hydraulic brake and applies braking forces to a brake hub 36 attached to the wheel attaching cylinder 16. With this configuration, braking forces are applied to the rotation of the wheel attaching cylinder 16, that is, the rotation of the rear wheel 7.

A partition wall 37 is disposed within the spindle 12. The partition wall 37 is formed by an annual plate body. An outer peripheral side of the partition wall 37 is attached on a boundary part between the tapered part 12A and the intermediate cylindrical part 12B of the spindle 12 by using bolts or the like. The partition wall 37 partitions the inside of the spindle 12 into a motor accommodating space part 37A accommodating the traveling motor 13 and a cylindrical space part 37B communicating with the inside of the wheel attaching cylinder 16.

A suction pipe 38 is disposed within the spindle 12 and the axle housing 10. A longitudinal one side of the suction pipe 38 axially extends within the axle housing 10 and is connected to a suction side of a lubricating oil pump 39. A longitudinal other side of the suction pipe 38 is positioned under the rotation shaft 14 to axially extend within the spindle 12 and to be held by the after-mentioned retainer 42. A tip end 38A of the suction pipe 38 projecting from the retainer 42 is bent in an L-letter shape to extend downward and is inserted in the radial hole 12H of the spindle 12. With this configuration, the tip end 38A of the suction pipe 38 is immersed in the lubricating oil L within the wheel attaching cylinder 16 and the lubricating oil pump 39 sucks up the lubricating oil L through the suction pipe 38.

A supply pipe 40 is disposed within the spindle 12 and the axle housing 10. The supply pipe 40 forms a circulation circuit of lubrication oil L together with the suction pipe 38, the lubricating oil pump 39 and the like. A longitudinal one side of the supply pipe 40 axially extends within the axle housing 10 and is connected to a delivery side of the lubricating oil pump 39. A longitudinal other side of the supply pipe 40 is positioned above the rotation shaft 14 and axially extends within the spindle 12 and is held by the retainer 42. A tip end 40A of the supply pipe 40 projecting from the retainer 42 is bent in an S-letter shape and extends along the rotation shaft 14 into the cylindrical projection part 33A of the second-stage carrier 33. In addition, an oil cooler 41 is disposed in the middle of the supply pipe 40. With this configuration, in a state where the lubricating oil L delivered from the lubricating oil pump 39 is cooled by the oil cooler 41, the cooled lubricating oil L is supplied via the tip end 40A of the supply pipe 40 to the rotation shaft 14 to cool the rotation shaft 14 and scatter from the rotation shaft 14, whereby the bearing 44 and the like are lubricated.

Figure 4:
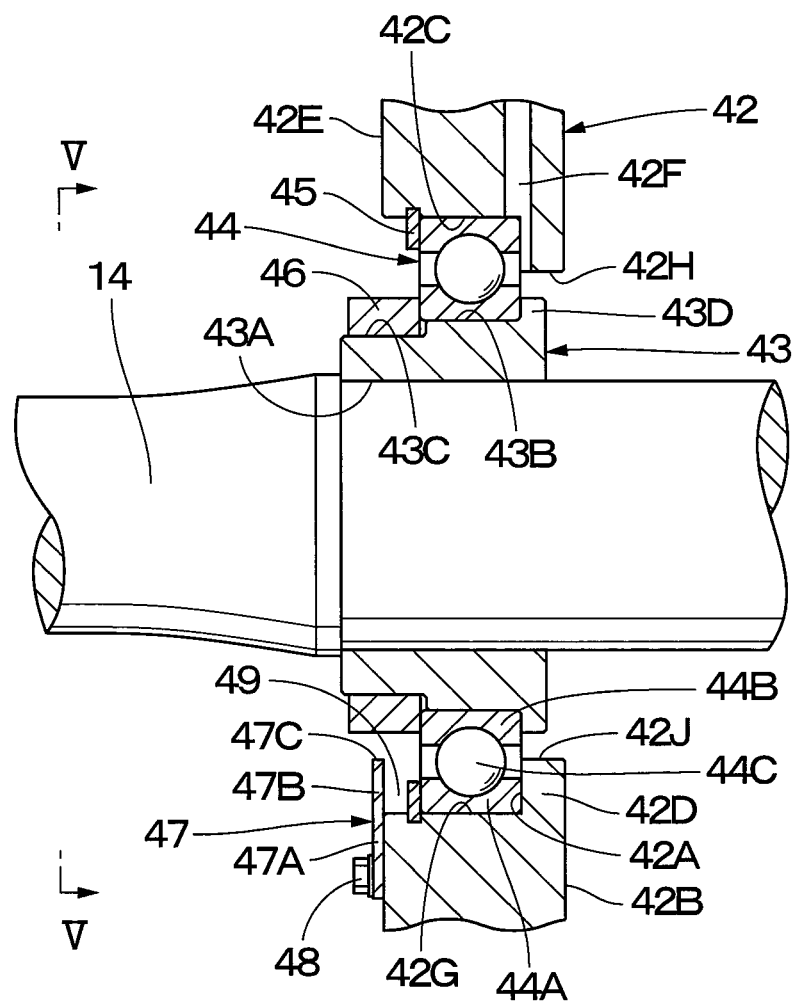
FIG. 4 is an enlarged view showing a rotation shaft, a bearing, a retainer, an oil reservoir plate and the like in FIG. 3.

The retainer 42 is attached to an inner-side projection part 12G of the spindle 12 (small-diameter cylindrical part 12C) by using bolts or the like. The retainer 42 is composed of a disc in the central part of which a bearing fitting hole 42A is formed and retains the bearing 44 fitted in the bearing fitting hole 42A and an axial other side of each of the suction pipe 38 and the supply pipe 40. As shown in FIG. 4, an annular collar part 42D is disposed on an axial one side surface 42B, which is positioned at the traveling motor 13-side, of the retainer 42 to extend to a radical inner side from an inner peripheral surface 42C of the bearing fitting hole 42A. The after-mentioned oil reservoir plate 47 is attached on an axial other side surface 42E, which is positioned at the gear reduction mechanism 21-side, of the retainer 42. Further, an oil passage 42F is formed in the retainer 42 to radially extend from an outer peripheral surface of the retainer 42 to the bearing fitting hole 42A. The oil passage 42F has one end (an upper end) that opens to the outer peripheral surface of the retainer 42 and the other end (a lower end) that opens to the bearing fitting hole 42A, which leads the lubricating oil L scattered on the outer peripheral surface of the retainer 42 to the bearing fitting hole 42A.

A sleeve 43 is disposed in a position, which corresponds to the bearing fitting hole 42A of the retainer 42, of the rotation shaft 14. The sleeve 43 is formed in a stepped cylindrical body provided with a shaft attaching hole 43A and an outer peripheral surface of the sleeve 43 is provided with a large-diameter outer peripheral surface 43B and a small-diameter outer peripheral surface 43C. Further, an annular flange part 43D is disposed on an axial one-side surface (traveling motor 13-side) of the sleeve 43 to extend from the large-diameter outer peripheral surface 43B to a radial outer side.

The bearing 44 is located via the retainer 42 on the inner peripheral side of the spindle 12 and rotatably supports the rotation shaft 14 to the spindle 12. The bearing 44 includes an outer ring 44A, an inner ring 44B and a plurality of rolling elements 44C. The outer ring 44A of the bearing 44 is fitted in the bearing fitting hole 42A of the retainer 42, and the inner ring 44B of the bearing 44 is fitted in the large-diameter outer peripheral surface 43B of the sleeve 43. The outer ring 44A of the bearing 44 is axially positioned by the collar part 42D of the retainer 42 and a stop ring 45 attached on the inner peripheral surface 42C of the bearing fitting hole 42A. The inner ring 44B of the bearing 44 is axially positioned by the flange part 43D of the sleeve 43 and an annular stopper 46 shrink-fitted in the small-diameter outer peripheral surface 43C.

Figure 5:
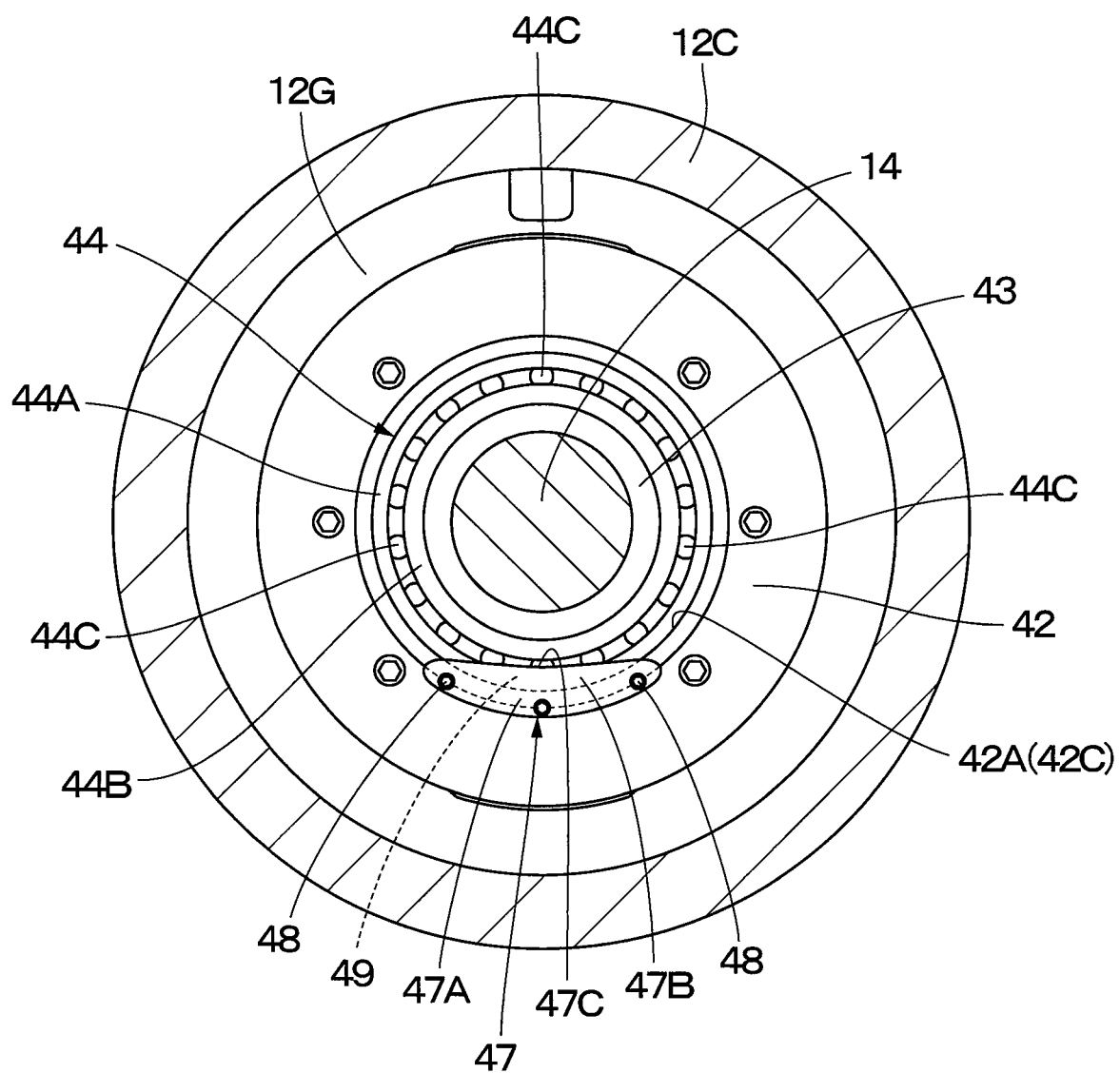
FIG. 5 is a cross section showing the rotation shaft, the bearing, the retainer, the oil reservoir plate and the like, as viewed in a direction of arrows V-V in FIG. 4.

The oil reservoir plate 47 is attached on the other side surface 42E, which is positioned at the gear reduction mechanism 21-side, of the retainer 42. That is, the oil reservoir plate 47 is disposed in a position (on a surface), which axially opposes via the bearing 44 the collar part 42D at the gear reduction mechanism 21-side, of the retainer 42. As shown in FIG. 4 and FIG. 5, the oil reservoir plate 47 is formed as a crescent-shaped plate body having a length dimension greater than an outer diameter dimension of the rotation shaft 14 and having a height dimension smaller than the outer diameter dimension of the rotation shaft 14. The oil reservoir plate 47 is provided with an attaching part 47A attached to the retainer 42 closer to the lower side than the center of the bearing fitting hole 42A and a wall part 47B that rises upward from the attaching part 47A and axially opposes the collar part 42D of the retainer 42.

In the oil reservoir plate 47, the attaching part 47A is attached on the other side surface 42E of the retainer 42 by using a plurality of bolts 48. A longitudinal central part of the oil reservoir plate 47 corresponds to a vertical line passing through a shaft center of the rotation shaft 14. In this state, the wall part 47B of the oil reservoir plate 47 axially opposes via the bearing 44 the collar part 42D of the retainer 42 (with the bearing 44 therebetween). With this configuration, the oil reservoir plate 47 forms an oil reservoir part 49 therein reserving lubricating oil L together with the inner peripheral surface 42C of the bearing fitting hole 42A and the collar part 42D in the retainer 42.

Here, an upper end edge 47C of the wall part 47B projects closer to the upward than a lowest part 42G of the inner peripheral surface 42C in the bearing fitting hole 42A formed in the retainer 42 and is located in a position lower than a lowest part 42J of an inner peripheral edge 42H in the collar part 42D. With this configuration, even when the lubricating oil L reserved in the oil reservoir part 49 exceeds a volume of the oil reservoir part 49, the lubricating oil L can be prevented from overflowing to the traveling motor 13-side over the collar part 42D in the retainer 42 to protect the traveling motor 13.

In this way, according to the present embodiment, the oil reservoir part 49 is formed by the oil reservoir plate 47, the inner peripheral surface 42C of the bearing fitting hole 42A and the collar part 42D in the retainer 42. With this configuration, after the lubricating oil L delivered from the lubricating oil pump 39 is supplied to the rotation shaft 14, the lubricating oil L that is scattered from the rotation shaft 14 and transfers from the inner peripheral surface of the spindle 12 to the outer peripheral surface of the retainer 42 or the lubricating oil L that is splashed by the gear reduction mechanism 21 or the like to be scattered on the outer peripheral surface of the retainer 42 and to be formed in a mist shape is led through the oil passage 42F in the retainer 42 to the bearing fitting hole 42A to be reserved in the oil reservoir part 49.

The traveling device 11 in the dump truck 1 according to the present embodiment has the configuration as described above, and next, an operation thereof will be explained.

When an operator which gets in the cab 5 of the dump truck 1 activates the engine 8, the hydraulic pump is driven and rotated, and electric power is generated by the power generator (none thereof are shown). At the time the dump truck 1 is driven to travel, the electric power is supplied from the power generator to the traveling motor 13. Thereby the traveling motor 13 is activated to rotate the rotation shaft 14.

The rotation of the rotation shaft 14 is decelerated and the decelerated rotation is transmitted to the planetary gear 24 from the sun gear 23 of the first-stage planetary gear reduction mechanism 22 and rotation of the planetary gear 24 is decelerated and the decelerated rotation is transmitted via the internal gear 25 and the coupling 28 to the sun gear 30 of the second-stage planetary gear reduction mechanism 29. In the second-stage planetary gear reduction mechanism 29, rotation of the sun gear 30 is decelerated and the decelerated rotation is transmitted to the planetary gear 31. At this time, since the cylindrical projection part 33A of the carrier 33 supporting the planetary gear 31 is spline-coupled to the small-diameter cylindrical part 12C of the spindle 12, the revolving movement of the planetary gear 31 (rotation of the carrier 33) is restrained.

Therefore, the planetary gear 31 rotates only on its axis around the sun gear 30 and the rotation decelerated by the rotating movement on its axis of the planetary gear 31 is transmitted to the internal gear 32 fixed on the wheel attaching cylinder 16. With this configuration, the wheel attaching cylinder 16 is decelerated by two stages by the first-stage planetary gear reduction mechanism 22 and the second-stage planetary gear reduction mechanism 29 and therefore, rotates with a large rotational toque. As a result, the left and right rear wheels 7 as drive wheels rotate integrally with the wheel attaching cylinder 16, making it possible to cause the dump truck 1 to travel.

An axial intermediate part of the rotation shaft 14 is rotatably supported via the bearing 44 and the retainer 42 on the spindle 12. With this configuration, when the rotation shaft 14 rotates at high speeds, the axial intermediate part can be suppressed from being radially deflected or core-shaken due to eccentricity of the rotation shaft 14 to improve the durability of the rotation shaft 14.

At the operating of the traveling device 11, the lubricating oil L reserved in the wheel attaching cylinder 16 is scooped up by the planetary gears 24, 31 configuring the planetary gear reduction mechanisms 22, 29, and the like, which is supplied to engaging parts between gears, the roller bearings 17, 18, the bearing 44 and the like. In addition, the lubricating oil L sequentially drops down to be collected to a lower side of the wheel attaching cylinder 16.

The lubricating oil L collected in the lower side of the wheel attaching cylinder 16 is sucked up from the tip end 38A of the suction pipe 38 by the lubricating oil pump 39 to be cooled by the oil cooler 41. Thereafter, the cooled lubricating oil L is delivered to the outer peripheral surface of the rotation shaft 14 from the tip end 40A of the supply pipe 40. The lubricating oil L delivered to the outer peripheral surface of the rotation shaft 14 cools the rotation shaft 14 and is also scattered by the rotation of the rotation shaft 14, which lubricates the bearing 44, the planetary gear reduction mechanisms 22, 29 and the like.

At this time, the lubricating oil L splashed by the planetary gear reduction mechanisms 22, 29 and part of the lubricating oil L scattered by the rotation of the rotation shaft 14 adhere to the inner peripheral surface of the small-diameter cylindrical part 12C configuring part of the spindle 12. The lubricating oil L having adhered to the inner peripheral surface of the small-diameter cylindrical part 12C moves to the outer peripheral surface of the retainer 42 along the inner-side projection part 12G of the small-diameter cylindrical part 12C and is thereafter led through the oil passage 42F in the retainer 42 to the bearing fitting hole 42A. The lubricating oil L led to the bearing fitting hole 42A lubricates the bearing 44 and flows to the lower side of the bearing fitting hole 42A to be reserved in the oil reservoir part 49 formed by the inner peripheral surface 42C of the bearing fitting hole 42A, the collar part 42D and the oil reservoir plate 47.

Here, when the traveling device 11 rotates at high speeds, the lubricating oil L accommodated in the inside of the wheel attaching cylinder 16 is pressed against the inner peripheral surface of the wheel attaching cylinder 16 by a centrifugal force, whereby in some cases the liquid surface position of the lubricating oil L is lowered. In this case, the tip end 38A of the suction pipe 38 is away from the lubricating oil L, and the lubricating oil L cannot be sucked up by the lubricating oil pump 39.

On the other hand, according to the present embodiment, the lubricating oil L can be reserved in the oil reservoir part 49 formed by the inner peripheral surface 42C of the bearing fitting hole 42A, the collar part 42D and the oil reservoir plate 47. Therefore, the lubricating oil L reserved in the oil reservoir part 49 can sufficiently be supplied to the bearing 44 regardless of the traveling state of the dump truck 1. As a result, it is possible to always smoothly rotate the rotation shaft 14 supported on the spindle 12 via the bearing 44 and the like to stably operate the traveling device 11 over a long period of time, thus improving the reliability of the traveling device 11.

In addition, the upper end edge 47C of the wall part 47B in the oil reservoir plate 47 is located in the position lower than the lowest part 42J of the inner peripheral edge 42H in the collar part 42D disposed in the retainer 42. With this configuration, even when the lubricating oil L reserved in the oil reservoir part 49 exceeds the volume of the oil reservoir part 49, the lubricating oil L can be suppressed from overflowing to the traveling motor 13-side over the collar part 42D in the retainer 42 to protect the traveling motor 13.

In this way, according to the first embodiment, the traveling device 11 includes: the cylindrical spindle 12 that is fixed on the vehicle body 2; the rotation shaft 14 that is disposed in such a manner as to axially extend on the inner peripheral side of the spindle 12 and is driven and rotated by the traveling motor 13; the wheel attaching cylinder 16 that is rotatably disposed on the outer peripheral side of the spindle 12 and on the outer peripheral side of which the wheel 7 is attached and in the inside of which the lubricating oil Lis accommodated; the gear reduction mechanism 21 that decelerates the rotation of the rotation shaft 14 and transmits the decelerated rotation to the wheel attaching cylinder 16; the retainer 42 that is provided with the bearing fitting hole 42A and is positioned between the traveling motor 13 and the gear reduction mechanism 21 to be disposed on the inner peripheral side of the spindle 12; and the bearing 44 that is inserted in the bearing fitting hole 42A in the retainer 42 and rotatably supports the rotation shaft 14 to the spindle 12, characterized in that the retainer 42 is provided with: the annular collar part 42D disposed on the surface (on the one side surface 42B) at the traveling motor 13-side, the annular collar part 42D extending to the radial inner side from the bearing fitting hole 42A and abutting on the bearing 44; and the oil reservoir plate 47 disposed on the surface (on the other side surface 42E) at the gear reduction mechanism 21-side, the oil reservoir plate 47 axially opposing the collar part 42D and forming the oil reservoir part 49 of the lubricating oil L together with the collar part 42D and the inner peripheral surface 42C of the bearing fitting hole 42A.

According to this configuration, the lubricating oil L to be supplied to the bearing 44 supporting the rotation shaft 14 can be reserved in the oil reservoir part 49. Therefore, the lubricating oil L reserved in the oil reservoir part 49 can always be supplied sufficiently to the bearing 44 regardless of the traveling state of the dump truck 1. As a result, always smoothly rotating the rotation shaft 14 enables the traveling device 11 to operate over a long period of time, thus improving the reliability of the traveling device 11.

In the embodiment, the oil reservoir plate 47 is provided with the attaching part 47A attached to the retainer 42 closer to the lower side than the center of the bearing fitting hole 42A and the wall part 47B that rises upward from the attaching part 47A and axially opposes the collar part 42D, and the upper end edge 47C of the wall part 47B is located in the position lower than the lowest part 42J of the inner peripheral edge 42H in the collar part 42D. According to this configuration, even when the lubricating oil L reserved in the oil reservoir part 49 exceeds the volume of the oil reservoir part 49, the lubricating oil L can be suppressed from overflowing to the traveling motor 13-side over the collar part 42D in the retainer 42 to protect the traveling motor 13.

Figure 6:
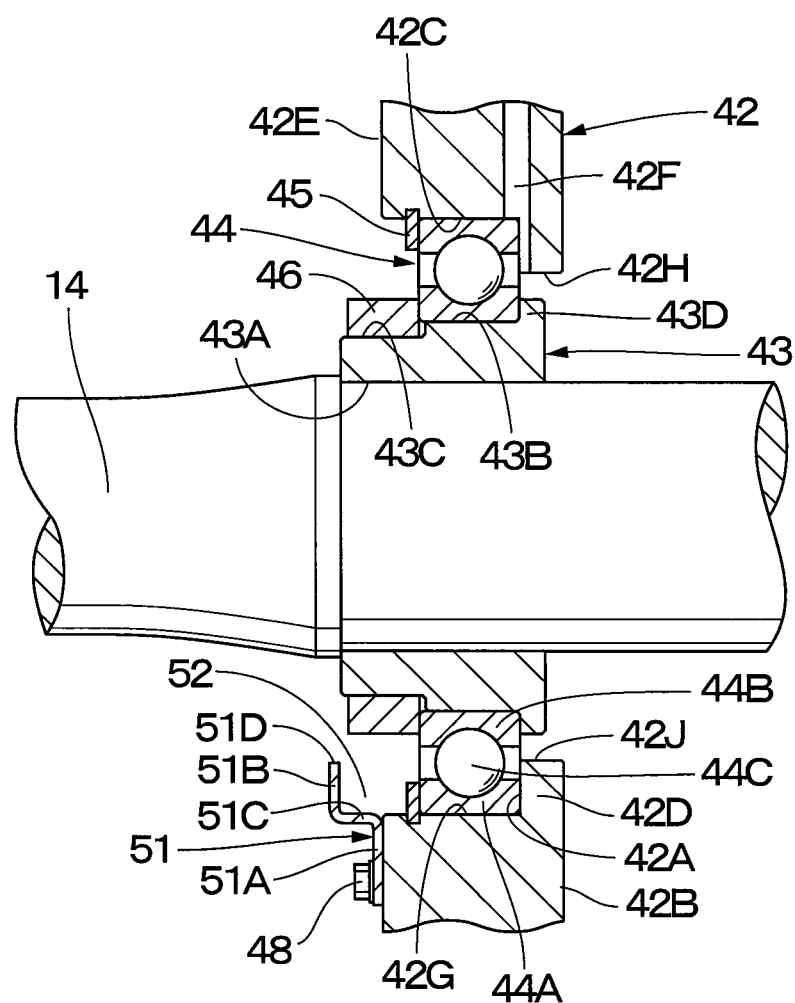
FIG. 6 is an enlarged view showing a rotation shaft, a bearing, a retainer, an oil reservoir plate and the like in a position as similar to that in FIG. 4 according to a second embodiment.

Next, FIG. 6 shows a second embodiment according to the present invention. The present embodiment is characterized in that an enlarging part is disposed between an attaching part and a wall part of an oil reservoir plate. It should be noted that in the present embodiment, components identical to those in the first embodiment are referred to as the identical reference numerals and an explanation thereof is omitted.

In the figure, an oil reservoir plate 51 is attached to the other side surface 42E, which is positioned at the gear reduction mechanism 21-side, of the retainer 42. The oil reservoir plate 51 is provided with an attaching part 51A and a wall part 51B as similar to the oil reservoir plate 47 according to the first embodiment. However, the oil reservoir plate 51 is different from the oil reservoir plate 47 according to the first embodiment in a point where an enlarging part 51C is disposed between the attaching part 51A and the wall part 51B.

The attaching part 51A of the oil reservoir plate 51 is attached to the other side surface 42E of the retainer 42 on the side lower than the center of the bearing fitting hole 42A by using the bolts 48. The enlarging part 51C of the oil reservoir plate 51 projects to the gear reduction mechanism 21-side from the attaching part 51A and axially extends toward the gear reduction mechanism 21. The wall part 51B of the oil reservoir plate 51 rises upward from the projection end of the enlarging part 51C and axially opposes the collar part 42D of the retainer 42. An upper end edge 51D of the wall part 51B projects closer to the upward than the lowest part 42G of the inner peripheral surface 42C in the bearing fitting hole 42A formed in the retainer 42 and is located in a position lower than the lowest part 42J of the inner peripheral edge 42H in the collar part 42D.

With this configuration, the oil reservoir plate 51 forms an oil reservoir part 52 for reserving the lubricating oil L together with the inner peripheral surface 42C in the bearing fitting hole 42A and the collar part 42D in the retainer 42. In this case, since the enlarging part 51C that axially extends is disposed between the attaching part 51A and the wall part 51B, the oil reservoir plate 51 can enlarge the volume of the oil reservoir part 52 by a volume of the enlarging part 51C.

The traveling device according to the second embodiment is provided with the oil reservoir plate 51 as described above and a basic function thereof is not particularly different from that of the traveling device 11 according to the first embodiment. That is, the oil reservoir plate 51 according to the present embodiment can enlarge the volume of the oil reservoir part 52 formed together with the inner peripheral surface 42C of the bearing fitting hole 42A and the collar part 42D by disposing the enlarging part 51C that axially extends between the attaching part 51A and the wall part 51B. As a result, it is possible to increase the lubricating oil L to be reserved in the oil reservoir part 52 to perform the lubrication to the bearing 44 over a long period of time.

In this way, in the second embodiment the enlarging part 51C that axially extends from the attaching part 51A toward the gear reduction mechanism 21 and enlarges the volume of the oil reservoir part 52 is disposed between the attaching part 51A and the wall part 51B of the oil reservoir plate 51. According to this configuration, since the lubricating oil L to be reserved in the oil reservoir part 52 increases by a volume of the disposed enlarging part 51C, the lubrication to the bearing 44 can appropriately be performed over a long period of time.

Figure 7:
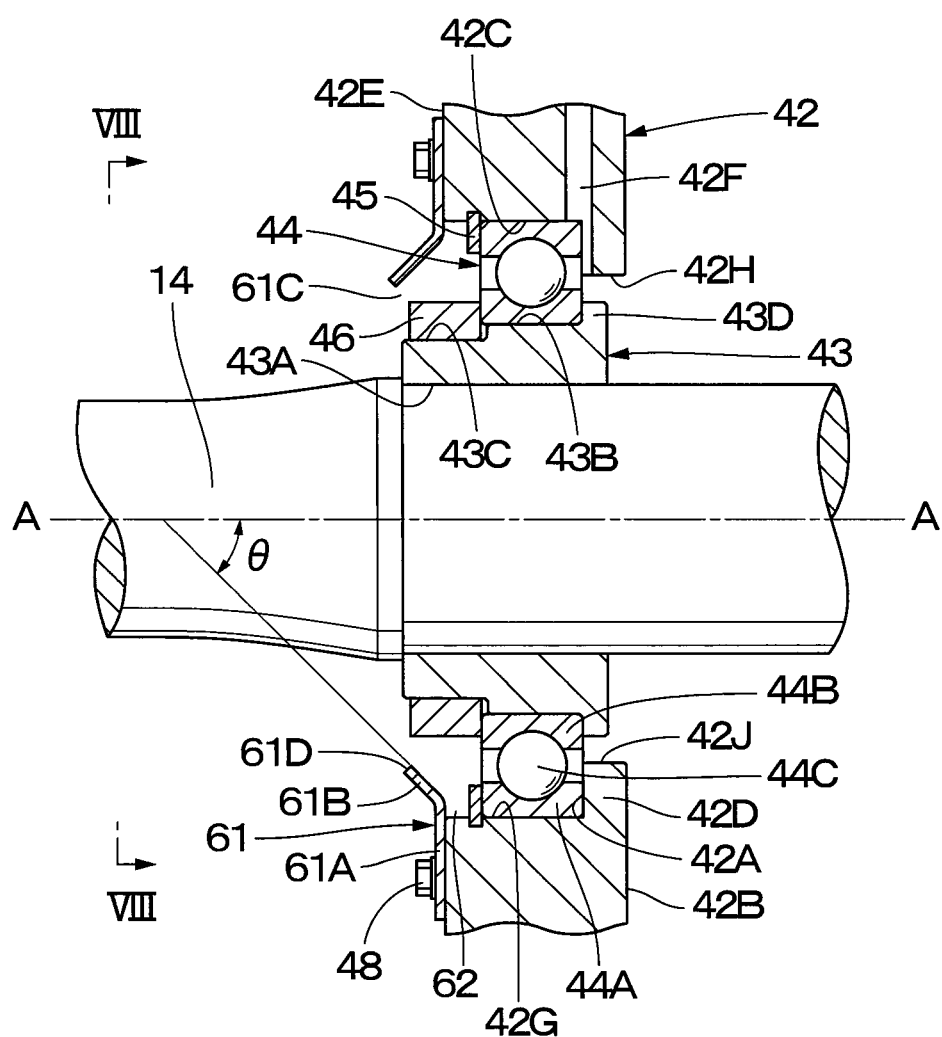
FIG. 7 is an enlarged view showing a rotation shaft, a bearing, a retainer, an oil reservoir plate and the like in a position as similar to that in FIG. 4 according to a third embodiment.
Figure 8:
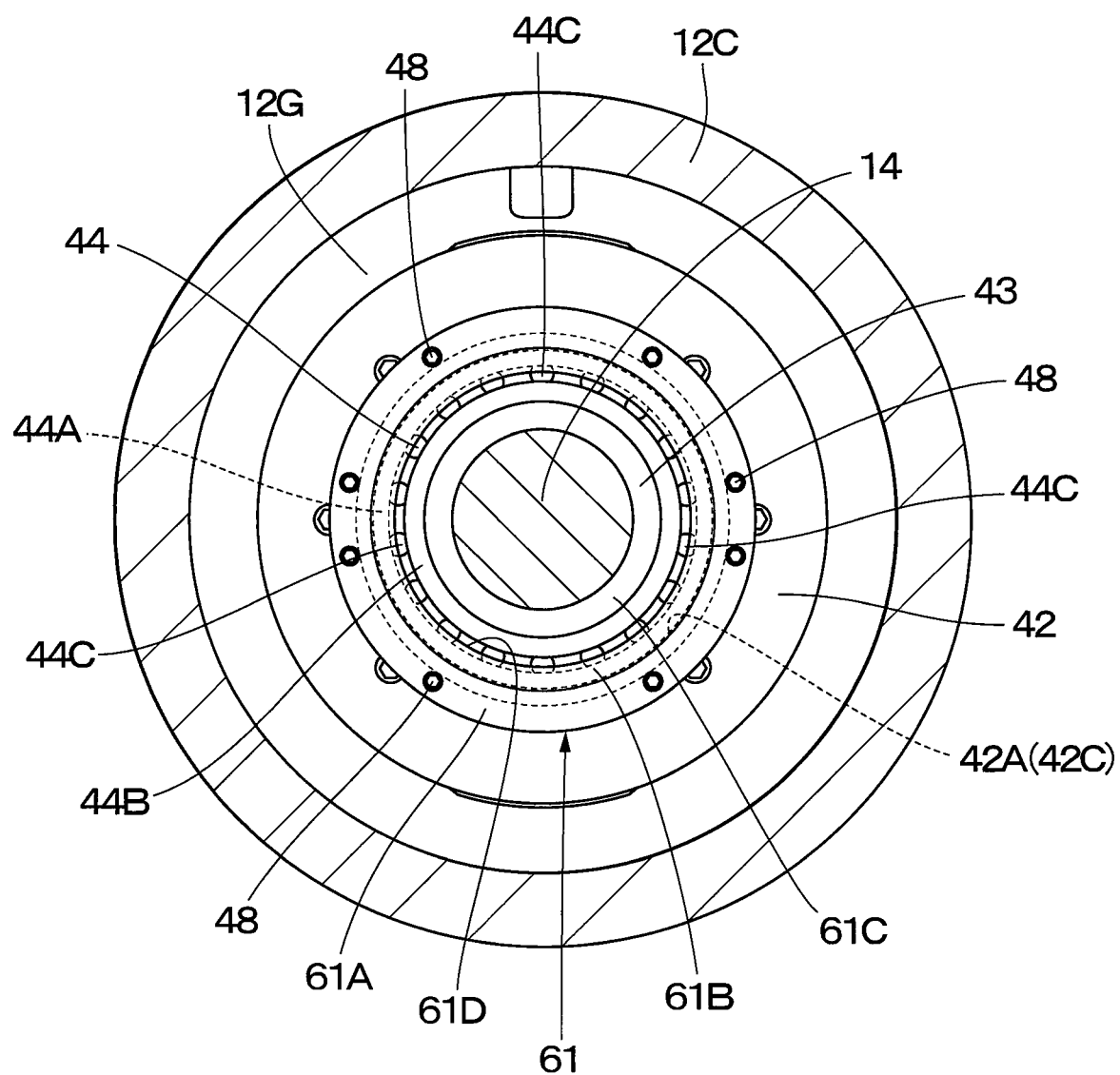
FIG. 8 is a cross section showing the rotation shaft, the bearing, the retainer, the oil reservoir plate and the like, as viewed in a direction of arrows VIII-VIII in FIG. 7.

Next, FIG. 7 and FIG. 8 show a third embodiment according to the present invention. The present embodiment is characterized in that an oil reservoir plate includes an annular attaching part attached to a retainer and an annular wall part extending to a radial inner side from the annular attaching part. It should be noted that in the present embodiment, components identical to those in the first embodiment are referred to as the identical reference numerals and an explanation thereof is omitted.

In the figures, an oil reservoir plate 61 is attached to the other side surface 42E, which is positioned at the gear reduction mechanism 21-side, of the retainer 42. The oil reservoir plate 61 is formed as an annular plate body as a whole and is provided with a flat annular attaching part 61A positioned on an outer peripheral side and a tapered annular wall part 61B extending from an inner peripheral side to a radial inner side of the annular attaching part 61A. An inner peripheral side of the annular wall part 61B is composed of a circular shaft through hole 61C, and the rotation shaft 14 is inserted in the shaft through hole 61C. The annular attaching part 61A is attached to the other side surface 42E of the retainer 42 by using the bolts 48. The center of the oil reservoir plate 61 corresponds to the center of the rotation shaft 14 and the annular wall part 61B of the oil reservoir plate 61 opposes the collar part 42D of the retainer 42 over an entire periphery thereof.

An inner peripheral edge 61D of the annular wall part 61B is located closer to the radical inner side than the inner peripheral surface 42C of the bearing fitting hole 42A formed in the retainer 42 and is located closer to the radial outer side than the inner peripheral edge 42H of the collar part 42D. With this configuration, the oil reservoir plate 61 forms an oil reservoir part 62 for reserving the lubricating oil L together with the inner peripheral surface 42C in the bearing fitting hole 42A and the collar part 42D in the retainer 42.

The annular wall part 61B of the oil reservoir plate 61 gradually reduces in diameter toward the rotation shaft 14 and projects in the tapered shape from the other side surface 42E of the retainer 42 to the gear reduction mechanism 21. Here, when the shaft center line of the rotation shaft 14 is indicated by A-A, an angle θ at which the tapered annular wall part 61B intersects with the shaft center line A-A of the rotation shaft 14 is set to a range larger than zero and smaller than 900 (0°<θ<90°). In this way, the tapered annular wall part 61B covers a range, which corresponds to the periphery of the bearing 44, of the rotation shaft 14 over an entire periphery of the rotation shaft 14 from an outer peripheral side thereof. Therefore, at the rotating of the rotation shaft 14 the lubricating oil L scattered from the rotation shaft 14, the sleeve 43, the stopper 46 and the like is received by the annular wall part 61B in the annular shape and thereafter, can smoothly be led to the oil reservoir part 62 along the tapered annular wall part 61B.

The traveling device according to the third embodiment is provided with the oil reservoir plate 61 as described above and a basic function thereof is not particularly different from that of the traveling device 11 according to the first embodiment. Therefore, the oil reservoir plate 61 according to the present embodiment is provided with an annular attaching part 61A in a flat annular shape attached to the other side surface 42E of the retainer 42 and an annular wall part 61B in an annular shape extending from an inner peripheral side to a radial inner side of the annular attaching part 61A. The annular wall part 61B gradually reduces in diameter toward the rotation shaft 14 and projects in the tapered shape toward the gear reduction mechanism 21, wherein an angle θ at which the annular wall part 61B intersects with the shaft center line A-A of the rotation shaft 14 is set to a range of 0°<θ<90°. With this configuration, the lubricating oil L scattered from the rotation shaft 14, the sleeve 43, the stopper 46 and the like is collected by the tapered annular wall part 61B, thus making it possible for the lubricating oil L to be efficiently reserved in the oil reservoir part 62. As a result, always smoothly rotating the rotation shaft 14 enables the traveling device 11 to stably operate over a long period of time.

In this way, in the third embodiment the oil reservoir plate 61 is provided with the annular attaching part 61A in the annular shape attached to the retainer 42 and the annular wall part 61B in the annular shape that extends to the radial inner side from the annular attaching part 61A and opposes the collar part 42D of the retainer 42 over the entire periphery. According to this configuration, the tapered annular wall part 61B can cover the rotation shaft 14 in a range of the periphery of the bearing 44 from the outer peripheral side, and the lubricating oil L scattered from the rotation shaft 14 in the range of the periphery of the bearing 44 is received by the annular wall part 61B and thereafter, can be led to the oil reservoir part 62 along an inclination of the annular wall part 61B.

In addition, in the third embodiment, the angle θ at which the annular wall part 61B of the oil reservoir plate 61 intersects with the shaft center line A-A of the rotation shaft 14 is set to a range of 0°<θ<90°. According to this configuration, the lubricating oil L scattered from the rotation shaft 14 in the range of the periphery of the bearing 44 is collected by the tapered annular wall part 61B, thus making it possible for the lubricating oil L to be efficiently reserved in the oil reservoir part 62.

Figure 9:
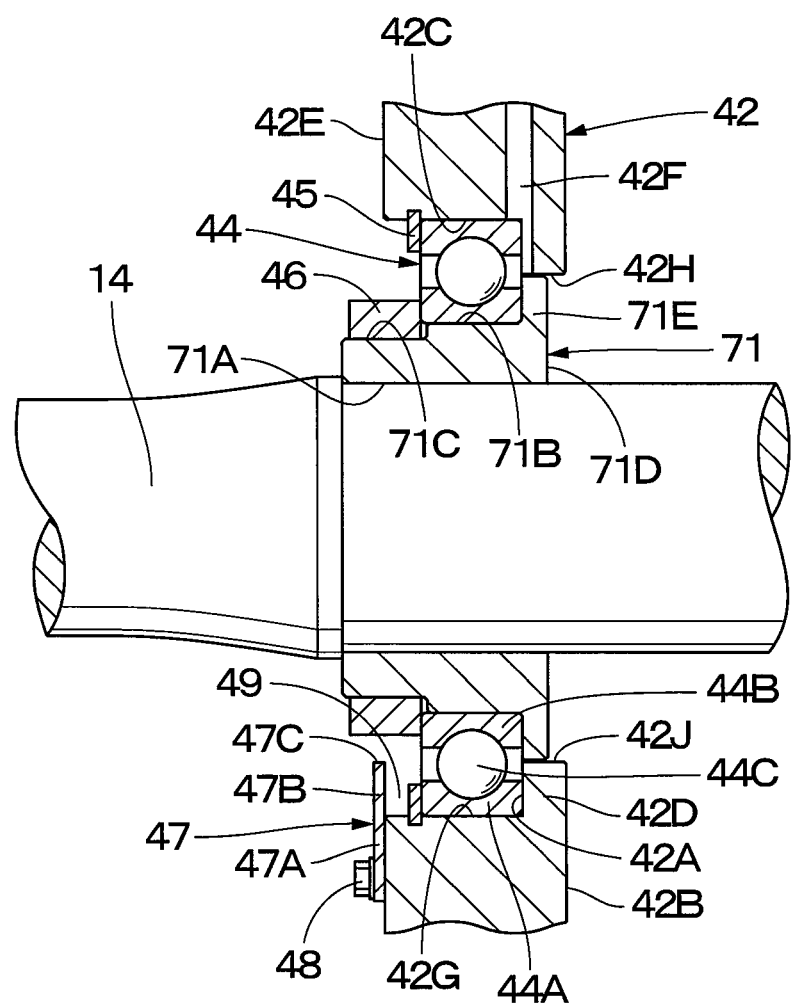
FIG. 9 is an enlarged view showing a rotation shaft, a bearing, a retainer, an oil reservoir plate and the like in a position as similar to that in FIG. 4 according to a fourth embodiment.

Next, FIG. 9 shows a fourth embodiment according to the present invention. The present embodiment is characterized in that a cylindrical sleeve an outer peripheral side of which serves as a bearing fitting part is attached to a rotation shaft and an annular sleeve-side collar part is disposed on a surface of the sleeve on a drive source side to extend to a radial outer side from the bearing fitting part. It should be noted that in the present embodiment, components identical to those in the first embodiment are referred to as the identical reference numerals and an explanation thereof is omitted.

In the figure, a sleeve 71 is disposed in a position, which corresponds to the bearing fitting hole 42A of the retainer 42, of the rotation shaft 14. The sleeve 71 is composed of, as similar to the sleeve 43 according to the first embodiment, a stepped cylindrical body provided with a shaft attaching hole 71A and an outer peripheral surface of the sleeve 71 is provided with a large-diameter outer peripheral surface 71B as the bearing fitting part and a small-diameter outer peripheral surface 71C smaller in diameter than the large-diameter outer peripheral surface 71B. However, the sleeve 71 is different from the sleeve 43 according to the first embodiment in a point where an after-mentioned sleeve-side collar part 71E is disposed on a surface of the sleeve 71 on an axial one side (traveling motor 13-side).

The sleeve 71 is provided with the large-diameter outer peripheral surface 71B as the bearing fitting part in which the inner ring 44B of the bearing 44 is fitted, and the annular sleeve-side collar part 71E is disposed on one side surface 71D as the axial one side (traveling motor 13-side) of the sleeve 71 to extend to the radial outer side from the large-diameter outer peripheral surface 71B. An outer diameter dimension of the sleeve-side collar part 71E is set to be larger than that of the inner ring 44B configuring part of the bearing 44 and smaller than an inner diameter dimension of the outer ring 44A. The inner ring 44B of the bearing 44 abuts on the stopper 46 fitted in the small-diameter outer peripheral surface 71C of the sleeve 71 and the sleeve-side collar part 71E to be axially positioned. In this state, an outer peripheral edge of the sleeve-side collar part 71E opposes an inner peripheral edge of the collar part 42D disposed in the retainer 42 with a slight annular gap, and the sleeve-side collar part 71E covers the bearing 44 from the traveling motor 13-side together with the collar part 42D in the retainer 42.

The traveling device according to the fourth embodiment is provided with the sleeve 71 as described above and a basic function thereof is not particularly different from that of the traveling device 11 according to the first embodiment. Therefore, in the present embodiment the outer peripheral edge of the sleeve-side collar part 71E disposed in the sleeve 71 opposes the inner peripheral edge of the collar part 42D disposed in the retainer 42 with the slight annular gap, and the sleeve-side collar part 71E covers the bearing 44 from the traveling motor 13-side together with the collar part 42D of the retainer 42. With this configuration, even when the lubricating oil L reserved in the oil reservoir part 49 exceeds the volume of the oil reservoir part 49, the lubricating oil L can certainly be suppressed from overflowing to the traveling motor 13-side by the collar part 42D of the retainer 42 and the sleeve-side collar part 71E of the sleeve 71 to protect the traveling motor 13.

In this way, in the fourth embodiment the cylindrical sleeve 71 the outer peripheral side of which is formed as the large-diameter outer peripheral surface 71B is attached to the rotation shaft 14, the bearing 44 is inserted via the sleeve 71 in the bearing fitting hole 42A of the retainer 42, and the sleeve-side collar part 71E is disposed on the surface of the sleeve 71 at the traveling motor 13-side to extend to the radial outer side from the large-diameter outer peripheral surface 71B and cover the bearing 44 from the traveling motor 13-side together with the collar part 42D in the retainer 42. With this configuration, in a case where the lubricating oil L reserved in the oil reservoir part 49 exceeds the volume of the oil reservoir part 49, the lubricating oil L can be suppressed from overflowing to the traveling motor 13-side by the collar part 42D of the retainer 42 and the sleeve-side collar part 71E of the sleeve 71.

It should be noted that the embodiment shows as an example a case where the oil lubricating oil L to be supplied from the circulation circuit configured of the suction pipe 38, the lubricating oil pump 39, the supply pipe 40 and the like and the mist-shaped lubricating oil L splashed by the gear reduction mechanism 21 are used for lubricating the rotation shaft 14, the roller bearings 17, 18, the gear reduction mechanism 21, the bearing 44 and the like. However, the present invention is not limited thereto, but, for example, only any one of the lubricating oil L to be supplied from a circulation circuit or the mist-shaped lubricating oil L splashed by the gear reduction mechanism 21 may be used.

In addition, the first embodiment shows the oil reservoir plate 47 formed in the crescent shape as an example. However, the present invention is not limited thereto, but an oil reservoir plate to be formed in various shapes such as a rectangular shape may be used.

Further, in the embodiment, the dump truck 1 of a rear-wheel drive type is explained as an example. However, the present invention is not limited thereto, but the present invention may be applied to a dump truck of a front-wheel drive type or a four-wheel drive type driving both front and rear wheels.

DESCRIPTION OF REFERENCE NUMERALS

1: DUMP TRUCK
2: VEHICLE BODY
7: REAR WHEEL (VEHICLE WHEEL)
12: SPINDLE
13: TRAVELING MOTOR (DRIVE SOURCE)
14: ROTATION SHAFT
16: WHEEL ATTACHING CYLINDER
21: GEAR REDUCTION MECHANISM
42: RETAINER
42A: BEARING FITTING HOLE
42C: INNER PERIPHERAL SURFACE
42D: COLLAR PART
44: BEARING
47, 51, 61: OIL RESERVOIR PLATE
47A, 51A: ATTACHING PART
47B, 51B: WALL PART
51C: ENLARGING PART
61A: ANNULAR ATTACHING PART
61B: ANNULAR WALL PART
49, 52, 62: OIL RESERVOIR PART
71: SLEEVE
71B: LARGE-DIAMETER OUTER PERIPHERAL SURFACE (BEARING FITTING PART)
71E: SLEEVE-SIDE COLLAR PART

The invention claimed is:

1. A traveling device for wheeled vehicle comprising:
a cylindrical spindle that is fixed on a vehicle body in a wheeled vehicle and is provided with a small-diameter cylindrical part of which a tip end opens;
a rotation shaft that is disposed in such a manner as to axially extend on an inner peripheral side of the spindle and is driven and rotated by a drive source, the rotation shaft having a tip end that projects from an open end of the small-diameter cylindrical part in the spindle and to which a sun gear is attached;
a wheel attaching cylinder that is rotatably disposed on an outer peripheral side of the spindle and on an outer peripheral side of which a wheel is attached and in the inside of which lubricating oil is accommodated;
a gear reduction mechanism including the sun gear that decelerates rotation of the rotation shaft and transmits the decelerated rotation to the wheel attaching cylinder;
a retainer that is provided with a bearing fitting hole and is positioned between the drive source and the gear reduction mechanism to be disposed on an inner peripheral side of the small-diameter cylindrical part in the spindle; and a bearing that is inserted in the bearing fitting hole of the retainer and rotatably supports an axial intermediate part of the rotation shaft to the spindle, wherein the retainer is provided with:

an annular collar part on a surface on the drive source side, the annular collar part extending to a radial inner side from the bearing fitting hole and abutting on the bearing; and an oil reservoir plate at the gear reduction mechanism side of the retainer, the oil reservoir plate being disposed in a position axially opposing the collar part via the bearing and forming an oil reservoir part of the lubricating oil together with the collar part and an inner peripheral surface of the bearing fitting hole, wherein the oil reservoir plate includes:

the oil reservoir plate is formed as a crescent-shaped plate body having a length dimension greater than the outer diameter dimension of the rotation shaft and having a height dimension smaller than the outer diameter dimension of the rotation shaft, an attaching part that is attached to the axial surface of the retainer on the gear reduction mechanism side a side lower than a center of the bearing fitting hole; and a wall part that rises upward from the attaching part and axially opposes the collar part via the bearing, and an upper end edge of the wall part is located in a position lower than a lowest part of an inner peripheral edge in the collar part.

2. The traveling device for wheeled vehicle according to claim 1, further comprising:

an enlarging part disposed between the attaching part and the wall part of the oil reservoir plate, wherein the enlarging part axially extends from the attaching part toward the gear reduction mechanism to enlarge the oil reservoir part.

3. The traveling device for wheeled vehicle according to claim 1, further comprising:

a cylindrical sleeve of which an outer peripheral side is formed as a bearing fitting hole attached to the rotation shaft, the bearing being inserted via the sleeve in the bearing fitting hole of the retainer; and a sleeve-side collar part disposed on a surface of the sleeve on the drive source side, the sleeve-side collar part extending to a radial outer side from a bearing fitting part and covering the bearing from the drive source side together with the collar part of the retainer.

4. The traveling device for wheeled vehicle according to claim 1, further comprising:

a lubricating oil pump for suctioning and delivering lubricating oil in the wheel attaching cylinder; and a supply pipe for leading the lubricating oil delivered from the lubricating oil pump to an upper part in the retainer.

5. The traveling device for wheeled vehicle according to claim 4, wherein the retainer includes an oil passage for leading the lubricating oil supplied from the supply pipe to the bearing.

* * * * *